United States Patent [19]
Singers et al.

[11] Patent Number: 5,960,381
[45] Date of Patent: Sep. 28, 1999

[54] STARFIELD DISPLAY OF CONTROL SYSTEM DIAGNOSTIC INFORMATION

[75] Inventors: Robert R. Singers, Brown Deer; Linda S. Endres, Milwaukee, both of Wis.

[73] Assignee: Johnson Controls Technology Company, Plymouth, Mich.

[21] Appl. No.: 09/111,491

[22] Filed: Jul. 7, 1998

[51] Int. Cl.⁶ .............................. G06T 1/00; G01F 15/00
[52] U.S. Cl. ........................... 702/183; 702/84; 702/182; 364/188; 345/440
[58] Field of Search .................................... 702/183, 182, 702/84; 364/141, 146, 188; 345/440, 433

[56] References Cited

U.S. PATENT DOCUMENTS

| | | | |
|---|---|---|---|
| 4,586,144 | 4/1986 | Fukumoto | 702/45 |
| 4,675,147 | 6/1987 | Shaefer et al. | 702/182 |
| 4,718,025 | 1/1988 | Minor et al. | 702/187 |
| 5,631,825 | 5/1997 | Van Weele et al. | 364/188 |
| 5,745,869 | 4/1998 | Van Bezooijen | 701/222 |
| 5,841,437 | 11/1998 | Fishkin et al. | 345/433 |

*Primary Examiner*—John Barlow
*Assistant Examiner*—Bryan Bui
*Attorney, Agent, or Firm*—Quarles & Brady LLP

[57] ABSTRACT

The operational state of a complex control system, with a number of operating units controlled by a plurality of sensing and input devices, can be dynamically displayed as a starfield. In the starfield, each operating unit is depicted by a separate cluster of stars representing the states of the sensing devices for that operating unit. The position and other display attributes of the stars denote the functional state of the associated device. An archive of starfields is maintained in a storage device with each such starfield depicting the state of the control system for a particular operating condition, such as a specific system error. When an unusual starfield occurs, it can be compared to the archived starfields to determine whether a problem exists and if so determine a solution.

14 Claims, 4 Drawing Sheets

STARFIELD DISPLAY OF CONTROL SYSTEM DIAGNOSTIC INFORMATION

FIELD OF INVENTION

The present invention relates generally to methods and apparatus for displaying operational information in a control system, such as a building management system; and more particularly to predicting, detecting and solving operational problems of the control system.

BACKGROUND OF THE INVENTION

Control systems, such as those used to control the environment within a building, generally include one or more sensors, an operational unit and a controller. The sensors detect a condition, such as temperature, pressure, humidity, air velocity, or an operational status of a device, such as on or off. The operational unit includes equipment, such as a heater, a chiller, a fan or a pump, capable of changing the detected condition. The controller receives a signal from the sensors and provides a control signal to the operational unit to control the associated equipment.

Commonly, the operational unit is controlled via a negative feedback loop to maintain the associated condition at a predefined setpoint or within a predetermined range. The controller determines a difference between the actual condition value as indicated by a sensor and the setpoint. In response the operational unit is controlled to reduce or eliminate the difference to obtain the desired setting for the condition.

Complex systems, such as building management systems, can generate substantial quantities of data that could easily overwhelm a person supervising or monitoring the system operation. The person needs to identify potential or actual operational problems in the system and respond to solve the problems in a timely manner. To do this, operational information must be displayed in a manner which is clearly understood and utilized by the monitoring personnel.

Graphic interfaces developed for displaying control information in facility management systems are illustrative of prior art methods and devices for displaying operational information in complex control systems. In the 1960's, process control and facility management systems used mimic panels located throughout a facility. These mimic panels consisted of dials, gauges, valves and switches mounted on large panels painted with electrical, plumbing, process or HVAC (heating, ventilation and air conditioning) duct diagrams. System operation was monitored by touring the plant and monitoring the individual panels.

In the early 1970's, these hard-wired panels were replaced with centrally located minicomputers and cathode ray tube displays. This allowed for a concentration of sensor data and thus savings in time for personnel who no longer had to walk around the plant or buildings, recording and checking system data panels. To present relationships between the data and the elements of the monitored system, projectors would display slides of the pictures which were formerly on the mimic panels. Thus, a single sensor, single indicator (SSSI) paradigm was maintained. The static signal which represented function or location was displayed on the slide with the assigned name while the name and the current value was on the CRT. The operator was expected to view the projector and the display to determine the relationship between the sensor's function or location and its value.

Color CRT displays were introduced in the late 1970's, but these merely replaced the slide projector with dynamic values overlaying the static picture. This made the display two levels deep: a static portion or background level, representing functional or locational references, and a dynamic portion or foreground level displaying the current sensor values. The dynamic portion of the display utilized color to indicate the status of the sensor (alarm or normal) or a switch state (on or off). Analog values were represented with a bar graph element which showed relative values with limits added so the operator could determine how closely a monitored condition was maintained to a desired setpoint.

However, in modern, complex control systems, the number of sensed and controlled parameters has continued to grow. Some complex systems may have 400,000 such parameters, and future systems will certainly have even more. Prior art display systems will not enable a process manager to effectively monitor large numbers of parameters. Moreover, prior art techniques are still tied to the location and function diagrams of the physical system. To move beyond these diagrams, and to allow the system to accommodate even greater levels of complexity, it is necessary to provide an abstract representation of the physical data.

An abstract representation of the data would allow the data and relationships among the data points to be more effectively presented. By observing visual attributes in an abstracted display, as well as patterns and changes in the display, an operator could monitor a greater amount of data. The operator could also determine relationships between operational parameters of individual components of the control system.

SUMMARY OF THE INVENTION

A control system includes a plurality of sensors producing input signals to a number of controllers for operating units of the system. The status of the control system is presented on a display device as a starfield comprising a plurality of stars representing sensed conditions clustered around a central star depicting the associated operational unit.

When a particular problem occurs in the system, data defining the corresponding starfield pattern is retained in a storage device. Additional starfield patterns which depict other operating conditions of the control system also can be stored. This creates an archive of previous conditions of the control system that are of interest and may be used in future control of the system. For example, the archive may be used to train new service personnel to recognize normal and abnormal states of system operation. In addition, a designation of a problem and its solution can be stored with the abnormal starfield pattern data as an aid to problem diagnosis in the future.

A processor of the control system is programmed to compare a current starfield pattern representing the present functioning of the control system to the previous starfield patterns retained in the storage device. The comparison produces a quantification of the degree of similarity which then can be used as an expression of the probability that the current starfield pattern indicates a problem that was associated with a particular retained starfield pattern. Such probability aids the service personnel in diagnosis and remedy of problems with control system operation.

DETAILED DESCRIPTION OF THE PREFERRED EMBODIMENT

Figure 1:
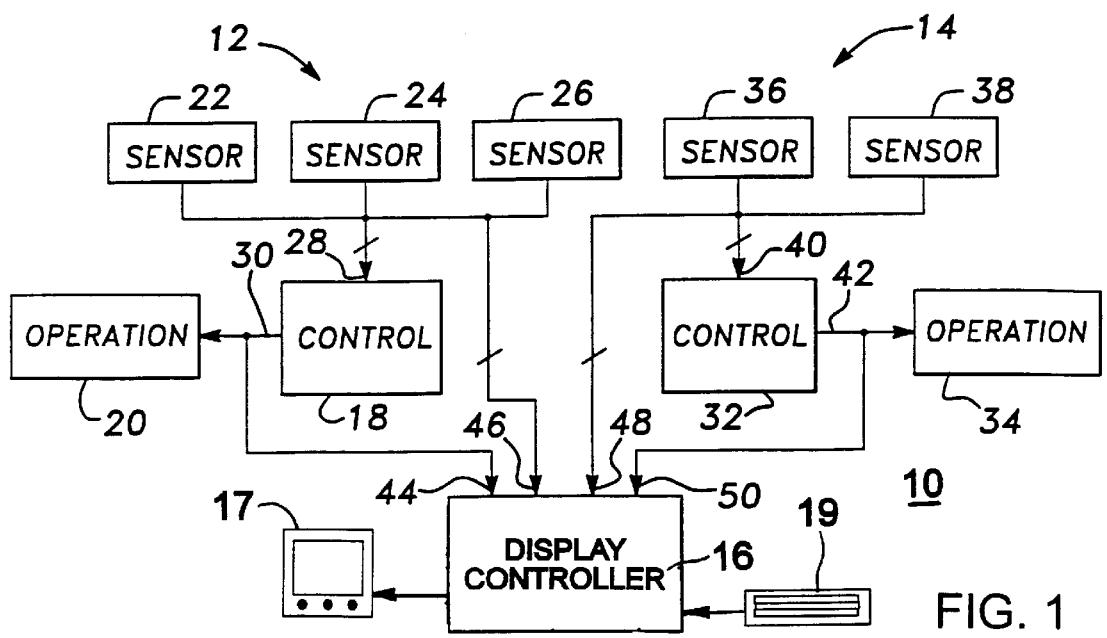
FIG. 1 is a functional block diagram illustrating a facility management system for controlling the environment in a building.

Referring now to FIG. 1, a control system 10 includes a first subsystem 12, a second subsystem 14, a display controller 16, a display monitor 17 and a keyboard 19 for entering functional commands. Although the illustrated control system 10 includes two subsystems those skilled in the art will understand that the system 10 can include any number of subsystems. The control system 10 will be described in terms of a facility management system which manages heating, cooling, air flow, lighting, security and fire detection in a building.

The first subsystem 12 includes a controller 18, an operational unit 20, a first sensor 22, a second sensor 24 and a third sensor 26. The sensors 22–26 detect a condition such as temperature, pressure, humidity, air velocity or an operational status, such as on or off. The sensors 22–26 provide a sensor signal, representative of the detected condition, to an input 28 of the controller 18. The sensor signal may be a voltage or current or a mechanical, optical or other interaction, and may consist of a group of signals associated with the respective sensors 22, 24 and 26. In response to the sensor signal, the controller 18 provides a control signal at an output 30 to the operational unit 20. The operational unit 20 responds to the control signal to vary the condition detected by the sensors 22–26.

The second subsystem 14 is similar in operation and construction to the first subsystem 12. The second subsystem 14 includes a controller 32, an operational unit 34, and two sensors 36 and 38. Those sensors 36, 38 detect a condition, which may be the same as or different from the conditions detected by the sensors 22–26 associated with the first subsystem 12. In response to the detected condition, the sensors 36, 38 provide a sensor signal to an input 40 of the controller 32. The sensor signal may be a voltage or current or a mechanical interaction, and may consist of a group of more than one individual signal associated with the respective sensors 36, 38. In response to the sensor signal, the controller 32 provides a control signal at an output 42 to the operational unit 34. The control signal may be an electrical, mechanical or other type of signal. In response to the control signal, the operational unit 34 produces an effect to vary the conditions detected by the sensors 36, 38.

In operation, the first subsystem 12 and the second subsystem 14 preferably implement negative feedback control loops, such as proportional-integral or proportional-integral-derivative control loops, as are well known in the art. Thus, the subsystems 12, 14 operate to maintain the condition detected by the sensors 22, 24, 26 and sensors 36, 38 at or near a predetermined setpoint condition. The setpoints may be the same or different.

A first input 44 of the display controller 16 receives the control signal produced at the output 30 of controller 18 and a second input 46 receives signals from sensors 22, 24, 26.

Similarly, the display controller 16 has a third input 48 coupled to the sensors 36 and 38 and a fourth input 50 coupled to the control signal output 42 of the controller 32.

In addition to input/output circuits, the display controller 16 includes a microprocessor and associated memory and a hard disk storage device in order to process the received input signals into a graphical display that is presented to building management personnel via a cathode ray tube (CRT) monitor 17. Alternative display devices, such as a flat panel display, liquid crystal display, printer, plotter, etc., could be employed in place of the CRT monitor 17.

The display controller executes a software routine which functions as a display processor that presents operational information about the control system 10 on the screen of monitor 17 in a starfield display formed by a plurality of star clusters. A star cluster is a pattern of bright regions with one or more visual attributes displayed against a dark field, similar to stars seen in the night sky. Alternatively, the star cluster can comprise dark regions or regions of any color displayed against a light or contrasting color background.

The starfield metaphor has certain attributes which establish interrelationships and make it universally understood. These attributes include the size of stars, their brightness or color, locational constancy relative to other stars, movement of stars over time, fixation of stars over time, the presence of clusters of stars which change little over time, and the occurrence of more than one time cycle which determines relationships, such as hourly, daily or yearly cycles.

Using these star attributes, single sensor, single indicator (SSSI) data are displayed graphically to communicate system operation information. The basis for the dynamic data in a starfield is a scatter diagram. Recognizable patterns which vary predictably over time and location may imply normal operation. If such a pattern cannot be discerned by an operator, the operator is prompted to look for something which causes the pattern to be different. From experience with system problems, the operator may also recognize error patterns. Dissimilar patterns correspond to different relationships among operational data for the system.

Figure 2:
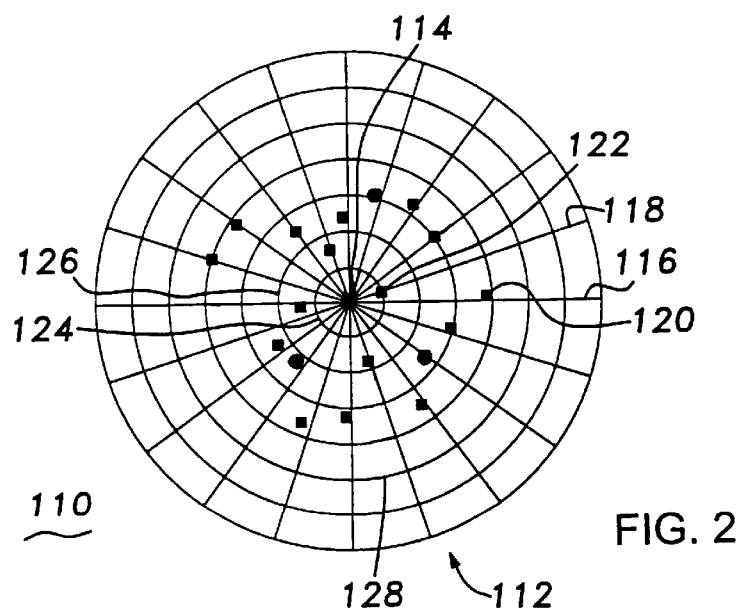
FIG. 2 is a star cluster illustrating operational information for a portion of a facility management system.

FIG. 2 depicts a star cluster 110 illustrating operational information for a portion of a facility management system 10. This star cluster 110 utilizes a polar coordinate plot 112 similar to a radar display. The polar coordinate plot 112 is centered on a primary star 114, which corresponds to an operational unit, e.g. 20 or 34 such as a fan, pump, heater or chiller of a building control system. Surrounding the primary star 114, and radially disposed on the polar coordinate plot 112 therefrom, is a plurality of secondary stars (e.g. 120 and 122) which represent sensors and other devices that control the associated operational unit. For example, a secondary stars could correspond to a temperature sensor, relative humidity sensor, security detector, heat sensors or smoke detectors or other devices which detect a condition in the environment of the monitored facility. The polar coordinates are depicted by a plurality of radii such as radius 116 and radius 118. Each of the secondary stars is displayed on one of the radii, for example a secondary star 120 is displayed on the radius 116 and a secondary star 122 is displayed on the radius 118.

The primary star 114 has one or more visual attributes corresponding to the functional status of the represented operational unit of the control system. For example, such visual attributes can include the displayed size, color, shape, blinking or fill pattern. Operational information which can be conveyed by these visual attributes include on or off state and normal or abnormal status of the operational unit corresponding to the primary star 114. Each of the secondary stars also has one or more visual attributes, such as size, color, shape, blinking or fill pattern, which convey information pertaining to the conditioning of the air in the area served by the operational unit corresponding to the associated primary star. For example, associated with each of the temperature sensors is a setpoint, which is the desired Iambient temperature (such as 72° F.) for the related building zone. Each of the temperature sensors also detects an actual temperature of the zone (such as 78° F.). A variance is defined as a difference between the setpoint and the sensed parameter value, in this case a variance of 6° F., and serves as an important indication of system control.

The polar coordinate plot 112 also includes a plurality of concentric rings, such as rings 124, 126 and 128. Each ring corresponds to a variation in actual, sensed, temperature from setpoint temperature. For example, ring 124 is the first concentric ring radially disposed from the primary star 114. Thus, could ring 124 correspond to temperature variance of 1° F. from setpoint, for example. Similarly, ring 128 is the fifth concentric ring radially disposed from the primary star 114, corresponding to temperature variance from setpoint of, for example, 5° F.

The radial distance from the primary star 114 at the center of the polar coordinate plot 112 to an associated secondary star corresponds to the temperature variance between the actual, or sensed, temperature and the setpoint temperature for the associated sensor. Secondary stars close to the primary star, such as secondary star 122, indicate that the actual temperature detected by the associated sensor is close to the related setpoint. As ambient temperatures vary from the setpoint, the secondary stars appear to drift radially outward from the primary star 114 at the center of the polar coordinate plot 112.

The color or another visual attribute of a secondary star indicates whether the sensed temperature is above or below the related setpoint. For example, red corresponds to a positive variance or a measured temperature which is too warm relative to the setpoint value. Blue corresponds to a negative variance or a measured temperature which is too cool relative to the setpoint temperature. A green secondary star indicates that its corresponding area is within a defined comfort range, for example, within ±1° F. of the setpoint value. On a monochrome monitor screen, the shape of a secondary star corresponds to the direction of the variance.

Figure 3:
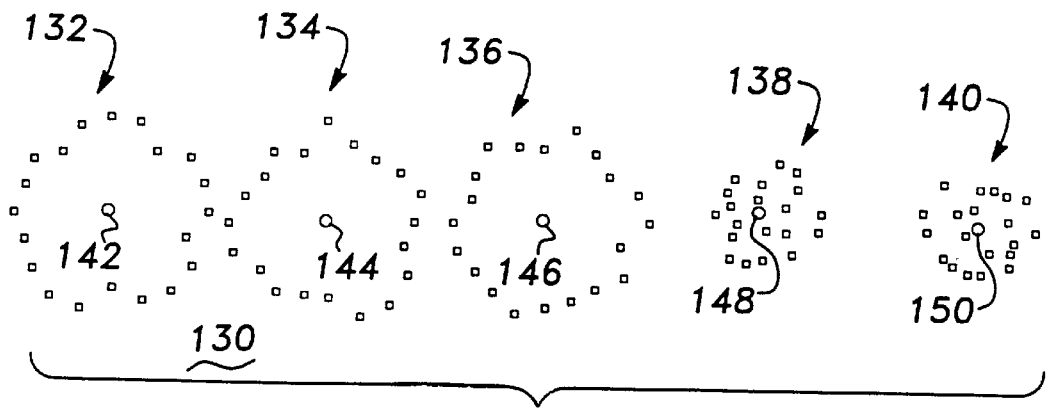
FIG. 3 is a starfield display comprising a plurality of star clusters.

The monitor 17 typically displays one or more horizontal lines of star clusters as a starfield display 130 shown in FIG. 3. The starfield display 130 includes first, second, third, fourth and fifth star clusters 132, 134, 136, 138 and 140, respectively, with their respective primary stars 142, 144, 146, 148 and 150. Each star cluster corresponds to an operational unit of a control system, such as fan, pump, heater or chiller. The primary stars 142–150 in the starfield display 130 are positioned along the horizontal axis to convey operational relationships. For example, the first three primary stars 142, 144, 146 may be associated with fans that share a common chiller loop.

In the starfield display of FIG. 3, information regarding the function of the operational units is abstracted to a comprehensible and easily discernable format for display. By observing the primary stars 142–150 and their associated secondary stars on the starfield display 130, the operator of the facility can tell at a glance if all the depicted operational units are in their proper functional state, and, if not, which units are operating improperly. For example, the first through third star clusters 132, 134 and 136 have secondary stars dispersed widely from the associated primary star, thus indicating that the respective sensed parameters are not close to the desired operational setpoints. The operator can determine at a glance by the primary star color that the associated operational units are off, the setpoints are not being maintained. The colors of the secondary stars also indicate that the building zone temperatures are too warm. This functional condition may be normal during periods when the associated zones of the building are unoccupied, such as at night and on weekends.

On the other hand if the color of the first primary star 142 indicates that the associated operational unit is on and running normally, the dispersed pattern of secondary stars indicates a problem with that unit, for example an air flow damper that is stuck closed. Similarly, if all the first through third primary stars 142–146 indicate that their associated operational units are running normally, the dispersed patterns of secondary stars may indicate a shared problem. For example if their respective operational units are supplied by the same chiller of the building HVAC system, the operator might deduce that the starfield display indicates a problem with the chiller loop. This deduction allows other information to be gathered and corrective action to be taken. Other conclusions can be made based on experience with other patterns in the starfield display.

In contrast, the more compact patterns of star clusters 138 and 140 denote that the sensed parameters of many of its secondary stars have a small variance from the desired operational setpoints. If the fourth and fifth operational units are depicted as being on, the setpoints are being maintained and the zone temperatures are considered comfortable.

Figure 4:
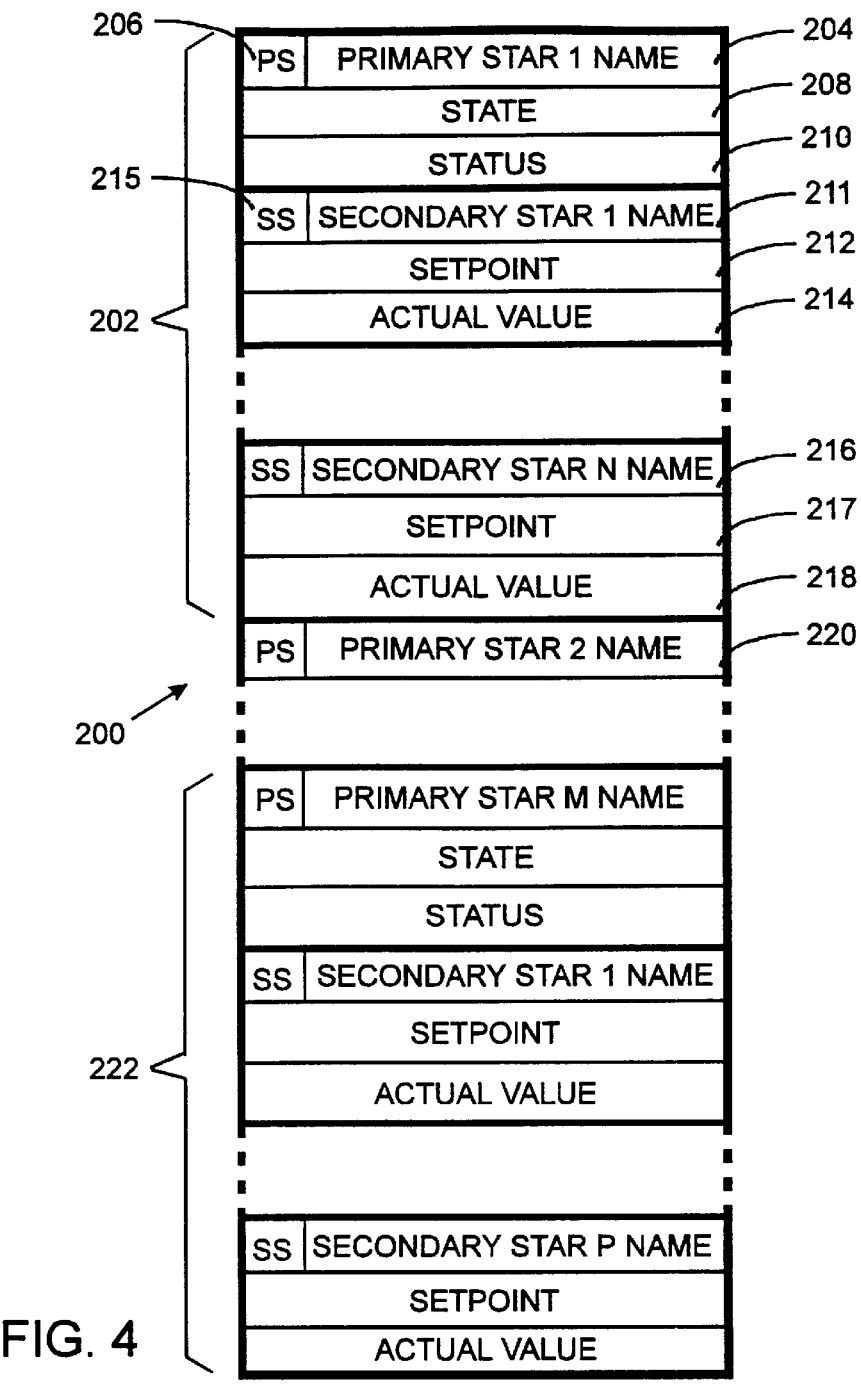
FIG. 4 depicts an example of a data structure that is used to store data for the starfield display in the memory of the facility management system.

With reference to FIGS. 1 and 4, the data depicting the present operational conditions of the control system 10 is stored within a memory of the display controller 16 by the display processor software routine. In particular, the data is stored within a section of the memory having a structure depicted in FIG. 4. The data is organized by star clusters and is further subdivided by the information relating to the primary star and each of the secondary stars of the cluster. The illustrated data structure is for a starfield having M star clusters with the first star cluster having N secondary stars and the Mth star cluster containing P secondary stars, where N, M, and P are positive integers. Specifically the data structure 200 has a first section of storage locations 202 for the first star cluster of the starfield display. That section 202 is further subdivided into a group of data fields for the primary star information and several groups of data fields for the information relating to the secondary stars within the associated star cluster. The group of data fields for the primary star commences with field 204 which has a preface set of data bytes 206 designating that field as relating to a primary star (PS). The remaining section of the first data field 204 contains the alphanumeric name of primary star 1. This name is assigned by the technician configuring the display controller to present the starfield display. Typically the name would enable the supervisory personnel to relate this cluster to the particular operational unit which it represents. That name may be displayed beneath the cluster in the starfield display, or may appear when the user places a cursor on the cluster. Thereafter there are two additional data fields 208 and 210 associated with primary star 1. The first of these fields 208 contains the state of the primary star and thus the corresponding operating unit. This state would indicate that the operating unit is on or off or in some other mode of operation. The status data field 210 contains an indication of whether the associated operational unit is in a normal or abnormal mode of operation and whether an alarm condition exists.

Following the group of data fields 204–210 for the primary star in the first cluster, is another set of data fields 211, 212, and 214 associated with the first secondary star in that cluster. The first of these data fields 211 contains a set of preface bits 215 designating that this field corresponds to a secondary star (SS). The remaining portion of data field 211 contains the alphanumeric name of the secondary star which has been assigned by the technician during system configuration and provides an indicator of the sensor associated with that secondary star. The next data field 212 contains the set point value for the associated sensor and data field 214 contains the actual value presently measured by that sensor. Following data field 214 are similar trios of data fields for each of the remaining secondary stars within the first cluster having primary star 1. For example, if the first star cluster has N secondary stars section 202 of the data structure will culminate in a trio of data fields, 216, 217, and 218 containing the information for the Nth secondary star.

Then the data structure 200 contains a section which commences with data field 220 for information regarding the second primary star. The data structure 200 culminates in a final section 222 containing a similar set of data fields which define the final or Mth star cluster of the starfield display. The display controller 16 is continually receiving new data on input lines 44, 46, 48, and 50 regarding the status of various devices on the control system 10. An input handling routine executed by the microprocessor within the display controller 16 receives the new input data and places the appropriate items of information into the corresponding data fields within the data structure 200 in the display controller memory. Thus the data for the starfield display is being continuously updated by the display controller 16.

Execution of the display processor software routine by the display controller 16 also periodically refreshes the starfield display on monitor 17 by scanning the fields of the data structure 200 and utilizing that data to construct the individual star clusters for the starfield display. Specifically, the routine knows the position on the monitor screen at which to display the first cluster and places the information regarding the primary star 1 at that location, the state and status data fields, 208 and 210 are utilized to determine the particular attributes of the primary star symbol, such as its color, size, shape, etc. Then for each of the secondary stars associated with the first cluster, the microprocessor of the display controller 16 determines the difference, or variance, between the set point value and the actual value for that secondary star. A symbol then is placed on the star cluster to indicate the magnitude of that variance and the particular attribute, whether it is above or below the set point. For example, the program for creating the star cluster display will place the indicia for the secondary star 1 at the radial line corresponding to the zero radial degrees on the polar coordinate plot and space the indicia outward from center a distance which corresponds to the magnitude of the variance. The indicia will then have a further attribute such as color to indicate whether the corresponding actual value is above or below the set point. This procedure is then repeated for each of the secondary stars in the first cluster.

Once the information for the first cluster has been stored within a display memory the display routine executed by the microprocessor of the display controller moves down the data table and repeats the process to create another star cluster for the next section of the starfield beginning with the primary star 2 in data field 220. This procedure continues until all of the clusters for the starfield display have been created within the display memory of display controller 16 and the display routine then commences again with the information for the first cluster within section 202. While this image update is going on, the information in the display memory is being read out and sent to the monitor 17 for presentation to the system operating personnel.

Figure 5:
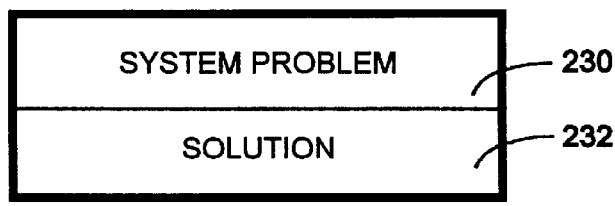
FIG. 5 depicts an example of a data structure that is appended to the starfield data structure of FIG. 5 upon archiving a starfield display.

If a particularly unusual starfield display is observed on monitor 17 that display can be stored within an archival storage device, such as a hard disk drive. For example, the starfield display indicative of a problem with the control system operation can be stored. When the problem has been properly diagnosed and a solution found that information may be entered into the display controller 16 via keyboard 19 and stored along with the archive copy of the starfield display. The archival copy of the data for the starfield display has the same format as that shown in FIG. 4 with the addition of the data fields 230 and 232 shown in FIG. 5 that contain the textual information that the system operator enters regarding the problem and its solution.

The starfield will be unique for any given building or other facility being managed as the operational units and sensors for each cluster will vary depending upon the particular configuration of the environmental control system for the building. Therefore building service personnel normally require experience in managing the particular building in order to be able to recognize the specific starfield patterns as denoting particular problem conditions. However the archived sets of starfield patterns for the particular building can be utilized to train new service personnel. By calling up starfield patterns for known problem situations and, by way of contrast, normal situations, the personnel can be trained to recognize the particular problems and their associated solutions.

The archived starfield patterns can also be utilized by the display controller 16 to provide an automatic diagnosis of building problems and present the solutions to the monitoring personnel via the display monitor 17. To accomplish this function, the display controller 16 executes a starfield comparison software routine either when manually commanded to do so by the system operator upon encountering an unfamiliar starfield display, automatically upon the occurrence of certain problem conditions, or on a timed basis.

Figure 6B:
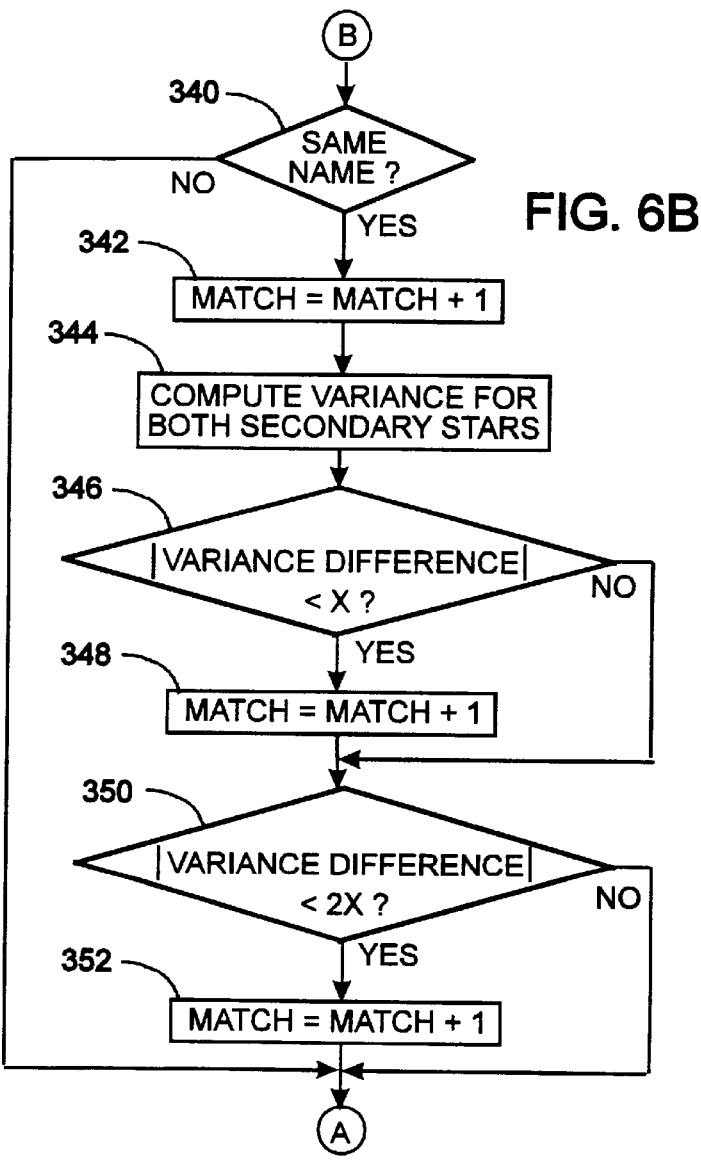
FIGS. 6A and 6B form a flowchart of the software routine which compares a current starfield pattern to a plurality of archived starfield patterns for known conditions.
Figure 6A:
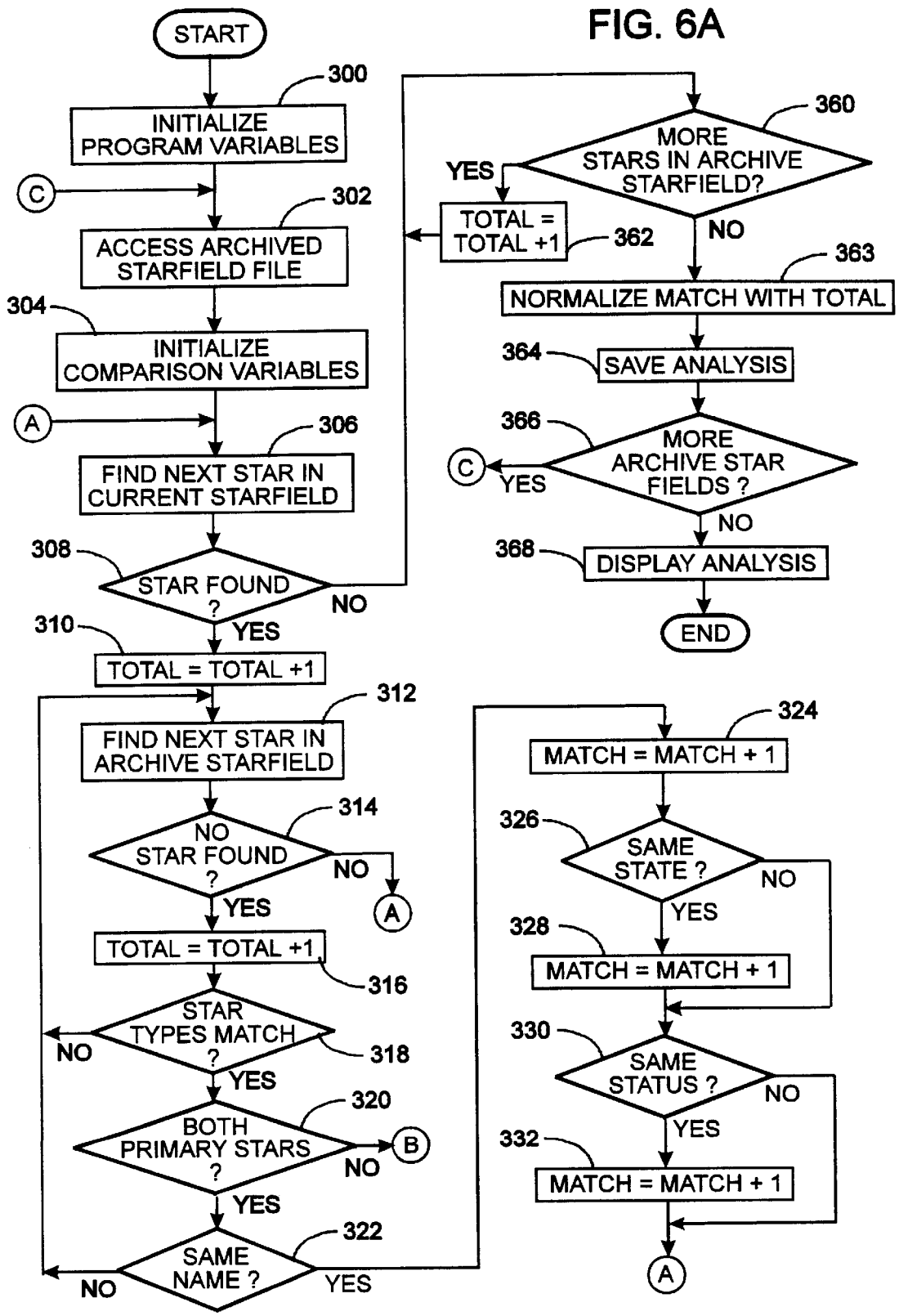

With reference to FIG. 6A, an exemplary starfield comparison routine commences at step 300 where variables utilized during the program execution are initialized. Then at step 302 the first starfield record in the archive memory of the display controller 16 is addressed and its contents read into the random access memory. The microprocessor of the display controller 16 then at step 304 initializes other variables utilized to compare the retrieved archive starfield to the current starfield representing the present operating condition of the control system 10.

At step 306, the microprocessor accesses the first star entry in the current starfield by searching for the next data field, (e.g. 204 in FIG. 4) which has a star class preface (e.g. 206). If a star data field was found the program execution advances through step 308 to step 310 where a variable designated TOTAL is incremented as a count of the stars processed by the starfield comparison routine. Then the first star in the archived starfield data record is accessed using a similar procedure at step 312. A determination is made by the display controller microprocessor whether a star was found in the archived starfield data record. If not the program execution returns to step 306 to check for additional stars in the current starfield.

Upon finding a star in the archived starfield data record, the microprocessor executes step 316 at which the TOTAL star count is incremented. Then at step 318, the types of the addressed stars in the current and archive starfields are compared. If the two stars are not both primary stars or both secondary stars, as indicated by prefaces PS or SS, the program execution returns to step 312 where the next star in the archive starfield is inspected.

When matching star types are found at step 318, a determination is made at step 320 whether they are both primary stars. If so the names of the addressed stars in the current and archive starfields are compared at step 322. When the names do not match, the program returns to step 312 to find another star in the archived starfield. However if the primary stars have identical names, the program execution advances to step 324 where a variable, designated MATCH, is incremented by one. The MATCH variable is a tally of how similar the current starfield pattern of the control system matches the retrieved archive starfield pattern. The greater the value of MATCH in comparison to the TOTAL number of stars analyzed at the end of the comparison process, the closer the two records match. The starfield comparison routine compares individual elements of the starfield pattern and weights the similarity between the two corresponding elements and adds that weight to the comparison variable MATCH.

Next at step 326 the state data (e.g. data field 208) for the primary stars of the two starfields are compared. If both primary stars have the same state, the variable MATCH is incremented again at step 328. Thereafter at step 330 the status of the two primary stars, as indicated by data field 210 for example, are compared and if they are the same, the MATCH variable is incremented by one at step 332. This completes the comparison of the primary stars in the related star clusters and the program execution returns to step 306.

In the normal course of events, the program now will access a secondary star in the current and archive starfields which are then compared. Therefore the program execution will advance through steps 306 to 320, at which point the microprocessor determines that both stars are the secondary type and the program jumps to step 340 in FIG. 6B. At this juncture the two secondary stars are compared to determine their similarity. First, the names of the two stars are compared and if found the same, the MATCH variable is incremented at step 342 to reflect that identity. At step 344 the variance for each of the secondary stars is computed. To do so the microprocessor within the display controller 16 obtains the set point and actual values from each star's data fields e.g. 212 and 214) in the respective starfield record and computes the difference between those two values for both stars. The microprocessor then compares the two variances and determines the difference between them. At step 346, a determination is made as to whether the absolute value of the variance is less than a value designated X. If so the comparison variable MATCH is incremented by one at step 348. Then at step 350 a determination is made whether the variance difference is within a larger range designated by the parameter 2X. If this is the case the MATCH variable is incremented by one at step 352. At the completion of steps 346–352, if the variances for the two secondary stars are relatively close, the MATCH variable will have been incremented by two; and if the two secondary star variances are slightly farther apart, the MATCH variable will be incremented only by one. However, the MATCH variable will not be incremented at this section of the starfield comparison routine when a significant difference (greater than 2X) exists between the two secondary star variances. Upon completion of step 352, the program execution returns to step 306 to obtain another star from the current starfield for comparison to a star in the archived starfield.

When the last star in the current starfield has been used in the analysis, the program execution advances from step 308 to step 360. At this time, the microprocessor searches for more stars in the archived starfield and increments the TOTAL variable each time a star is found. Thus the starfield comparison routine continues to count the stars in the archived starfield.

When no further stars are found the values of TOTAL and MATCH are employed to produce a value designated SIMILARITY which quantifies the degree to which the archived starfield is similar to the current starfield. First, at step 363, the MATCH value is normalized based on the number of stars (TOTAL) found in the current and archived starfield. Without normalization, the same value for MATCH could be produced by an archived starfield that had the same number of stars as the current starfield and by an archived starfield that had many more additional stars, as may occur if the control system had been reconfigured without deleting archived starfields from the earlier configuration. The SIMILARITY value is stored in a temporary output data table in the display controller memory along with the name or address of the corresponding archived starfield data record at step 364.

Thereafter, the program execution advances to step 366 where a determination is made whether there are additional archived starfields to compare to the current starfield in which case the program execution jumps to step 302 to compare those archived starfields to the current starfield.

When all of the archived starfields have been compared to the current starfield, the program execution advances to step 368 where the results of the archival comparison are displayed on the screen of monitor 17, in place of the current starfield pattern. To create this display the microprocessor within the display controller 16 sorts the output data table to organize the entries in descending order of the magnitude of the SIMILARITY variable. This places the analysis information in order based on how most closely the archived starfields match the current starfield. The tabular data is displayed to the user in this descending order of similarity along with the information regarding the problem and the solution stored within the final data fields of the corresponding archived starfield data structures. This presents the system operator with a listing of likely problems represented by the current starfield pattern and the solutions to those problems which have been utilized in the past. This provides information to the system operator as to what courses of action to take to remedy the problem situation represented by the current starfield pattern. This information is presented in terms of the solutions which are most likely to cure the problem in a descending order of likelihood of success. In some situations where the solution to the problem can be taken automatically by the control system, the information regarding the solution may be communicated to the corresponding controllers 18 or 32 to take the proper corrective action automatically without requiring operator intervention.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

We claim:

1. A method for providing operational information in a control system, which includes a plurality of operational units that respond to signals from a plurality of sensors, said method comprising:

producing a first starfield pattern wherein the starfield pattern has a plurality of star clusters which depict functional statuses of the plurality of operational units and the plurality of sensors;

storing data defining a plurality of additional starfield patterns which depict statuses of the plurality of operational units and the plurality of sensors;

storing, for each one of the plurality of additional starfield patterns, a designation of an operational condition of the control system represented by that one of the plurality of additional starfield patterns;

comparing the first starfield pattern to each of the plurality of additional starfield patterns to determine a degree of similarity therebetween; and selecting a designation of an operational condition from storage in response to the degree of similarity between a given one of the plurality of additional starfield patterns and the current starfield pattern.

2. The method as recited in claim 1 wherein the designation of an operational condition is a functional problem represented by that given one of the plurality of additional starfield patterns.

3. The method as recited in claim 2 further comprising storing, for each of the plurality of additional starfield patterns, a solution to the functional problem represented by that additional starfield pattern.

4. The method as recited in claim 3 further comprising displaying the designation of an operational condition which was selected.

5. The method as recited in claim 1 further comprising displaying a plurality of designations of operational conditions listed in order of the similarity between one of the plurality of additional starfield pattern associated with each of the plurality of designations and the current starfield pattern.

6. The method as recited in claim 1 wherein storing data defining each of the plurality of additional starfield patterns comprises for each star cluster:

storing a state for an operational unit; and storing information defining a variance between a setpoint and a sensed value for each sensor to which the operational unit responds.

7. The method as recited in claim 1 wherein storing data defining each of the plurality of additional starfield patterns comprises for each star cluster:

storing a state for an operational unit; and storing a setpoint and a sensed value for each sensor to which the operational unit responds.

8. The method as recited in claim 1 wherein storing data defining each of the plurality of additional starfield patterns comprises for each star cluster:

storing a name, a state and a status for an operational unit; and storing a name, a setpoint and a sensed value for each sensor to which the operational unit responds.

9. The method as recited in claim 8 wherein the step of comparing compares the current starfield pattern to each of the plurality of additional starfield patterns by comparing the name, state and status for each operational units, and the name and variance for each sensor.

10. A control system comprising:

a plurality of sensors configured to produce a plurality of sensor signals in response to sensed conditions;

a plurality of operational units, each configured to produce a control effect in response to one or more of the sensor signals;

a display processor which receives data regarding the sensor signals and functions of the operational units and produces a starfield pattern depicting the sensed conditions and function of the operational units;

a storage device for storing data that defines selected starfield patterns; and a starfield comparator which compares a given starfield pattern to each of the selected starfield patterns stored in the storage device and produces an indication of similarity there between.

11. The control system as recited in claim 10 wherein for each selected starfield pattern, the storage device also stores a designation of an operational condition represented by that selected starfield pattern.

12. The control system as recited in claim 10 wherein for each selected starfield pattern, the storage device also stores a designation of a functional problem represented by that selected starfield pattern, and a solution to the functional problem.

13. The control system as recited in claim 10 wherein the storage device comprises:

a storage location for a state for an operational unit; and a storage location for information defining a variance between a setpoint and a sensed value for each sensor to which the operational unit responds.

14. The control system as recited in claim 10 wherein the storage device comprises:

storage locations to contain a name, a state and a status for an operational unit; and storage locations to contain a name, a setpoint and a sensed value for each sensor to which the operational unit responds.

* * * * *